United States Patent
Popescu et al.

(10) Patent No.: US 7,886,039 B2
(45) Date of Patent: Feb. 8, 2011

(54) METHOD AND APPARATUS FOR PROVIDING DYNAMIC GROUP MANAGEMENT FOR DISTRIBUTED INTERACTIVE APPLICATIONS

(75) Inventors: George V. Popescu, Stamford, CT (US); Zhen Liu, Tarrytown, NY (US); Sambit Sahu, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/165,546

(22) Filed: Jun. 30, 2008

(65) Prior Publication Data

US 2008/0263207 A1    Oct. 23, 2008

Related U.S. Application Data

(63) Continuation of application No. 10/723,227, filed on Nov. 26, 2003.

(51) Int. Cl.
G06F 15/16   (2006.01)
G06F 15/177  (2006.01)
G06F 15/173  (2006.01)

(52) U.S. Cl. ............... 709/223; 709/224; 709/205; 709/220

(58) Field of Classification Search ............. None
See application file for complete search history.

(56) References Cited

U.S. PATENT DOCUMENTS

| | | | | |
|---|---|---|---|---|
| 5,317,742 A * | 5/1994 | Bapat | ........................... | 707/714 |
| 5,457,797 A * | 10/1995 | Butterworth et al. | ........ | 719/320 |
| 5,535,426 A | 7/1996 | Leigh et al. | | |
| 5,606,664 A | 2/1997 | Brown et al. | | |
| 5,758,072 A * | 5/1998 | Filepp et al. | ................. | 709/220 |
| 5,761,502 A | 6/1998 | Jacobs | | |
| 5,774,689 A * | 6/1998 | Curtis et al. | ................... | 703/21 |
| 5,828,843 A | 10/1998 | Grimm et al. | | |
| 5,968,121 A | 10/1999 | Logan et al. | | |
| 6,009,257 A | 12/1999 | Berman | | |
| 6,023,562 A | 2/2000 | Baker et al. | | |
| 6,097,942 A * | 8/2000 | Laiho | ....................... | 455/414.1 |
| 6,108,702 A | 8/2000 | Wood | | |
| 6,192,401 B1 | 2/2001 | Modiri et al. | | |
| 6,243,746 B1 | 6/2001 | Sondur et al. | | |
| 6,301,109 B1 | 10/2001 | Chu et al. | | |
| 6,330,602 B1 | 12/2001 | Law et al. | | |
| 6,477,572 B1 * | 11/2002 | Elderton et al. | ............. | 709/224 |
| 6,487,600 B1 | 11/2002 | Lynch | | |
| 6,925,431 B1 | 8/2005 | Papaefstathiou | | |
| 7,447,785 B2 | 11/2008 | Kaler et al. | | |

(Continued)

*Primary Examiner*—David E England

(57) ABSTRACT

A method, computer readable media, and apparatus of hierarchical-based communication session and data distribution management that indexes client's communication preferences and network attribute information. Indexing is used to generate dynamic group membership lists that map into communication groups. Indexing is replicated at control nodes in the network overlay to allow distributed management of group membership. Send/receive operations are decoupled through data distribution and the indexing structure. Senders and receivers register their group communication interests to a parent node in the hierarchy. The session control structure aggregates client interest and dynamically updates replicas at control nodes which are selected according to the changes in registered client interest. The indexing structure has self-managing properties for automatic clustering based on client session and data interests, and dynamic partitioning of the session/data interest attribute space. Group membership is managed by querying the indexed session/data distribution management structure and mapping output to communication groups.

20 Claims, 5 Drawing Sheets

U.S. PATENT DOCUMENTS

| | | | |
|---|---|---|---|
| 7,725,570 B1* | 5/2010 | Lewis ......................... 709/224 |
| 7,725,571 B1* | 5/2010 | Lewis ......................... 709/224 |
| 7,730,172 B1* | 6/2010 | Lewis ......................... 709/224 |
| 7,761,514 B2* | 7/2010 | Popescu et al. ............. 709/205 |
| 2002/0129135 A1* | 9/2002 | Delany et al. ............... 709/223 |
| 2002/0133591 A1 | 9/2002 | Makarios et al. |
| 2002/0165934 A1 | 11/2002 | Conrad et al. |
| 2003/0097438 A1 | 5/2003 | Bearden et al. |
| 2003/0101278 A1 | 5/2003 | Garcia-Luna-Aceves et al. |
| 2004/0030705 A1 | 2/2004 | Bowman-Amuah |
| 2004/0068667 A1 | 4/2004 | Kumhyr et al. |
| 2004/0179538 A1* | 9/2004 | Makofka et al. ............ 370/398 |
| 2004/0218529 A1 | 11/2004 | Rodosek et al. |
| 2005/0010571 A1 | 1/2005 | Solotorevsky et al. |
| 2005/0021398 A1 | 1/2005 | McCleskey et al. |
| 2005/0044255 A1 | 2/2005 | Yokoyama |
| 2005/0076137 A1 | 4/2005 | Tang et al. |
| 2005/0083848 A1 | 4/2005 | Shao et al. |
| 2005/0114478 A1* | 5/2005 | Popescu et al. ............. 709/220 |
| 2005/0177629 A1 | 8/2005 | Betge-Brezetz et al. |
| 2006/0080413 A1 | 4/2006 | Oprea et al. |
| 2006/0080438 A1 | 4/2006 | Storrie |
| 2007/0156593 A1 | 7/2007 | Porte |
| 2009/0210528 A1* | 8/2009 | Swildens et al. ............ 709/224 |

* cited by examiner

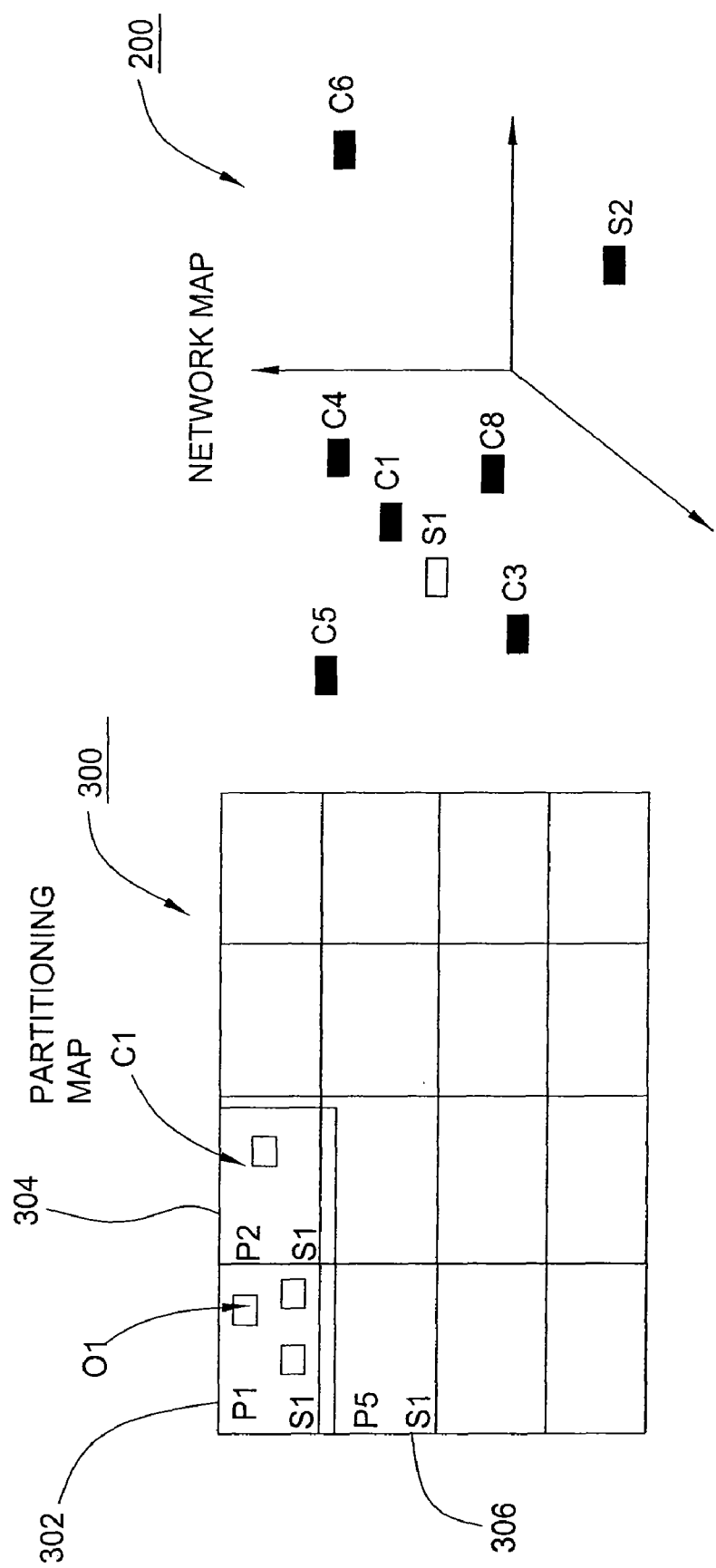

METHOD AND APPARATUS FOR PROVIDING DYNAMIC GROUP MANAGEMENT FOR DISTRIBUTED INTERACTIVE APPLICATIONS

This application is a continuation of co-pending U.S. patent application Ser. No. 10/723,227 filed on Nov. 26, 2003, entitled METHOD AND APPARATUS FOR PROVIDING DYNAMIC GROUP MANAGEMENT FOR DISTRIBUTED INTERACTIVE APPLICATIONS, which is incorporated herein by reference.

BACKGROUND OF THE INVENTION

1. Field of the Invention

Embodiments of the present invention generally relate to network communications. More particularly, embodiments of the present invention relate to communication management based on network and on application criteria.

2. Description of the Related Art

Data communications in large scale distributed interactive systems, such as virtual environments and online games, require efficient data path control. Typically, users have been grouped together according to their explicit interest subscription or on an interest function that is evaluated at the application level. Such groupings have been used to control communications over a multitude of possible data paths and to a multitude of users.

Because of the diverse communication requirements of applications and users, a number of different data communication architectures have been proposed. For example, publication-subscription architectures can provide efficient data filtering at the application level by having an application server group users (and their communication criteria) into communication-requirement based classes, and then selectively communicating using group-based data distributions. While publication-subscription architectures are beneficial if an application's users can be efficiently grouped, such architectures do not take into consideration or make allowances for optimizing data paths according to end-to-end performance requirements, which can be important in time and/or data loss sensitive distributed applications. Furthermore, if the number of publishers becomes very large, inherent network node limitations can create communication bottlenecks. Similar problems exist in other communication architectures such as interest-based communication architectures in which users specify and enter interest-based cells that partition an application space. Such interest-based communication architectures have the additional drawback that the application space partition information must be distributed to all users, which creates problems when the application space is dynamically partitioned.

The publication-subscription architectures and the interest-based communication architectures are examples of distributed content architectures that are designed to support direct communications between a small number of applications and a large number of users. Such architectures have been based on a particular application having an application server or servers that directly controls data distributions between the application and its users. However, many solutions do not take into account network metrics for session management while optimizing communication network infrastructure according to real-time application constraints.

Therefore, a method of using network middleware to provide communication services for distributed interactive applications by using a hierarchical mapping of participating nodes in a multidimensional network/application attribute space and automatic interest-based session management would be beneficial.

SUMMARY OF THE INVENTION

An embodiment of the principles of the present invention generally provides for a method of data communications for collaborative interactive applications using both network attributes and user communication interest.

Embodiments of the present invention provide for methods of using network middleware to provide communication services for distributed interactive applications using a hierarchical mapping of participating nodes in a multidimensional network/application attribute space and automatic interest-based session management. Such embodiments can provide for automatic interest-based session management with session control performed by dynamic grouping of users according to their application-level communication interests. Such embodiments can implement a session hierarchical structure that is replicated at network forwarding nodes and at higher levels in the hierarchy. Dynamic changes in membership can trigger modifications in the session hierarchical tree and at the forwarding nodes that participate in the dynamically changed session.

Embodiments of the present invention provide for multiple large-scale interactive sessions that are supported on one communication infrastructure by establishing a hierarchical index of session information that is replicated on a distributed mesh of overlay nodes. Application spaces are modeled as N-dimensional attribute spaces that are partitioned into smaller cells that are mapped to communication groups. Dynamic partitioning of application spaces into variable size cells, transparent migration of users between cells, and dynamic repartitioning of application spaces are supported by communication middleware.

Embodiments of the present invention implement a session and data distribution management method that uses a hierarchical structure and that indexes client's communication preferences and network attribute information. The indexing structure generates dynamic group membership lists that map into communication groups. Indexing is partially replicated at control nodes in a network overlay, thus allowing distributed management of group membership. Send/receive operations are decoupled through data distribution and the session indexing structure. Senders and receivers register their group communication interest to a parent node in the hierarchy, and then the session control structure aggregate client's interest and dynamically update the replicas at control nodes selected according to the changes in client interest. The indexing structure has self-managing properties for automatic clustering based on a client session, on data interest, and on dynamic partitioning of the session/data interest attribute space. Group membership is managed by querying the indexed session/data distribution management structure at each control node and mapping output to the communication groups.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is high level block diagram of an embodiment of a network middleware device that is suitable for implementing dynamic group management in accord with the principles of the present invention;

FIG. 2 illustrates network map information;

FIG. 3 illustrates an application space and application space partitions;

To facilitate understanding, identical reference numerals have been used, wherever possible, to designate identical elements that are common to the figures.

DETAILED DESCRIPTION OF THE PREFERRED EMBODIMENT

The principles of the present invention relate to a hierarchical-based communication session management system that indexes client's communication preferences and network attribute information. Indexing is used to generate dynamic group membership lists that map into communication groups. Indexing is replicated at control nodes in the network overlay to allow distributed management of group membership. Send/receive operations are decoupled through data distribution and the indexing structure. Senders and receivers register their group communication interests to a parent node in the hierarchy. The session control structure aggregates client interest and dynamically updates replicas at control nodes which are selected according to the changes in registered client interest. The indexing structure has self-managing properties for automatic clustering based on client session and data interests, and dynamic partitioning of the session/data interest attribute space. Group membership is managed by querying the indexed session/data distribution management structure and mapping output to communication groups.

Figure 1:
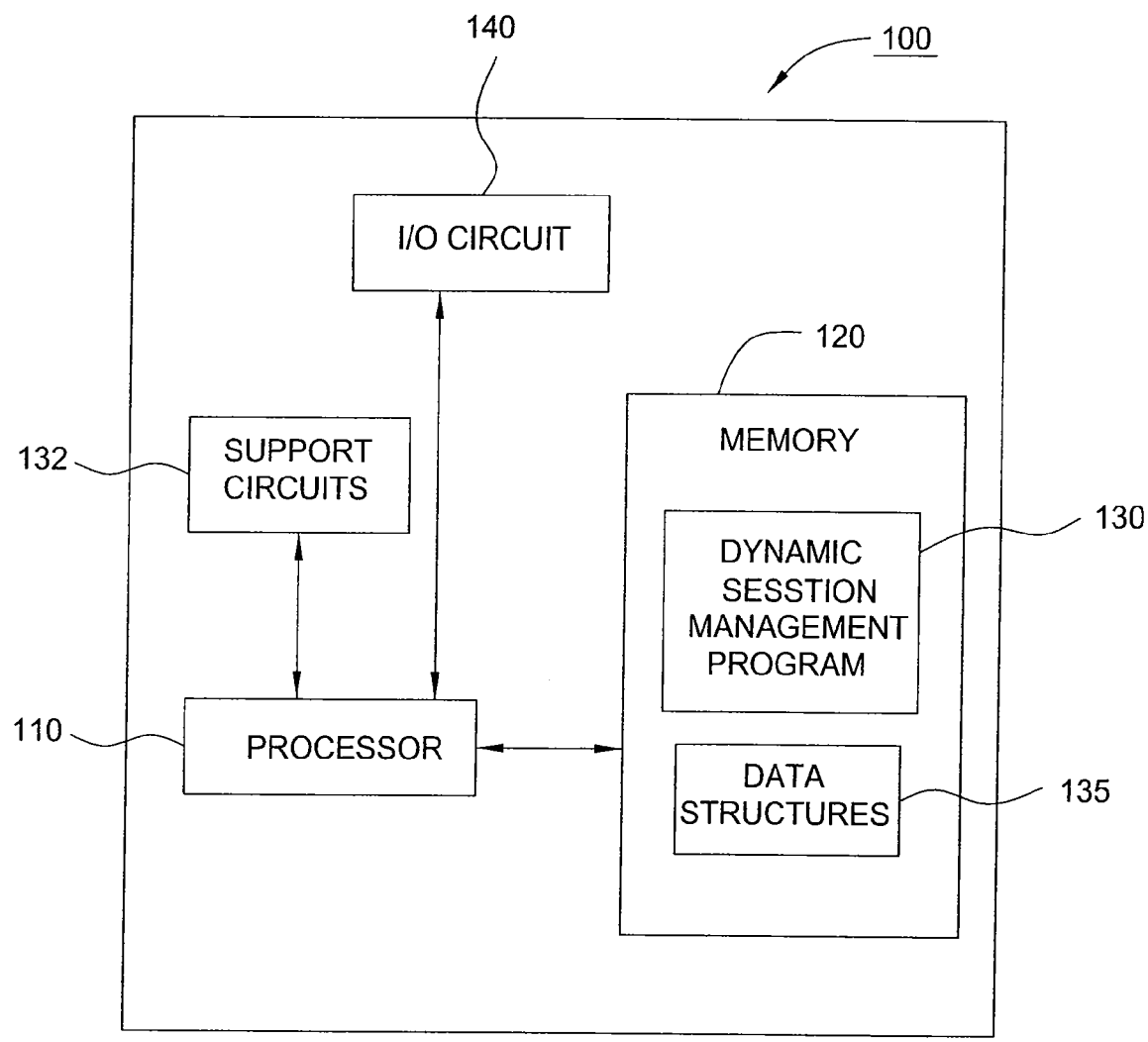

FIG. 1 is a high level block diagram of an embodiment of a network middleware device 100 that is suitable for implementing dynamic session management in accord with the principles of the present invention. The network middleware device 100 comprises a processor 110 and a memory 120 for storing a dynamic session management program 130. The processor 110 cooperates with conventional support circuitry 132, such as power supplies, clock circuits, cache memory and the like, that assist in executing the dynamic session management program 130. The memory 120 further includes data structures 135. Those data structures are multi-attribute structures that are described subsequently. The memory 120 includes a computer readable medium for storing software for operating the middleware device 100.

It is contemplated that some of the method steps discussed below are implemented as software processes. However, as is well known, software processes, and thus the method steps discussed below, may be implemented within hardware and/or or in firmware. As such, the method steps described herein are intended to be broadly interpreted as being equivalently performed by software, hardware, or a combination thereof. The network middleware device 100 also contains input-output circuitry 140 that forms an interface between the various functional elements, application servers, and users that communicate with the network middleware device 100.

An embodiment of the present invention maps application and network level information to form a common abstraction where clients, network resources (network level objects), and application level information is represented as objects defined by multiple attributes. Network resources are comprised of virtual IDs and network attributes such as network position parameters, network fanout, and delays. Application objects include group membership objects that are comprised of a list of parameters for group identification, an index of network objects in the group; and virtual content objects that include IDs and content holders.

The maps containing application level information and network resources are used for controlling information dissemination according to application constraints. Examples of controlled information dissemination include partitioning a group object on server resources for distributed group membership control and managing group membership for overlapping sets of overlay nodes at control overlay nodes.

What follows makes reference to a dynamic session management of virtualized network object IDs such as servers s1 . . . s4, clients c1 . . . c8; network 3D maps s1(s11, s12, s13), . . . c1(C11, c12, c13), . . . . Application/virtual space partioning map of virtual space partitions P1 . . . P16, C-P map: c1(P1,P2); c2 (P6,P7,P8); c3(P1,P2,P5); and content partioning/replication map: contents: o1 . . . o10, O-P map: P1(o1, o2, o3); P2(o4, and S-P map s1(P1, P2, P5), s2(P1, P2, P4). The result is a multi-attribute indexing structure that fulfills grouping constraints of features such as response time, capacity constrains (s1 satisfies the grouping constraint-max rtt to c1, c3). This is subject to dynamic group membership: g1(s1)(c1,c3)(o1, o2, o3, 04)

FIGS. 2 and 3 illustrate how a session management and data distribution infrastructure uses network resource maps, application interest maps, and application object maps. Network resources are characterized by multiple criteria, including network delay attributes, forwarding capacity attributes, and object category (client, server, middleware, etc.). FIG. 2 shows a "virtual" three-dimensional network delay space 200 having client nodes C1, C3, C4, C5, C6, and C8, and server nodes S1 and S2. While FIG. 2 shows a three-dimensional network delay space, it should be understood that the actual number of dimensions is a function of the target average error of representing round trip time (RTT) distances by Euclidean network space distances. By using the "virtual" three-dimensional network delay space map, clients and servers can be serviced based on round-trip time delays to achieve a communication goal. For example, clients and application servers can be assigned to communication middleware nodes so as to minimize round trip time delays. Other network resource characteristics have similar virtual maps and can be used in similar ways to achieve specific communication goals.

While FIG. 2 illustrates how network resources can be mapped to achieve specific communication goals, the principles of the present invention also manage communications based on the application space partitioning. For example, FIG. 3 illustrates an application space 300 that is divided based on communication interests into 16 partitions. Partition P1 (element 302) and partition P2 (element 304) are of communication interest to a client C1, while partition P5 (element 306) is not of interest to client C1. Partitions P1, P2, and P5 are mapped to an application server S1. Furthermore, the communication interest represented by partition P1 is made available to a network overlay node o1. Thus, an application can be characterized by an application space 300 that can be partitioned into areas of interest to some clients, but not others, a given client may have interests in multiple partitions, and at least some of the partitions are made available to network overlay nodes.

Embodiments of the inventive communication session and data distribution management system make use of several types of virtual maps. A first type is content replication maps in which the map indicates the partitioning of the content on available network resources. A cell in the content partition is a collection of content objects (e.g. files, data streams, media objects). A content replication map indicates the set of content cells which are replicated at each network resource (servers).

Another type of map is a communication interest (session) partition map. A session map indicates the partitioning of current communication interest subjects to show the communication interest subjects in each partition cell.

Yet a more general representation of is an application object map in which objects (communication interest objects, content objects, etc.) defined by an application are partitioned are partitioned in a space defined by a set of associated descriptors and are then mapped to network resources. The mapping of application objects partitioning into network resources can be done by allocating multiple partitions per network resource and replication of a partitions at multiple network resources.

Figure 4:
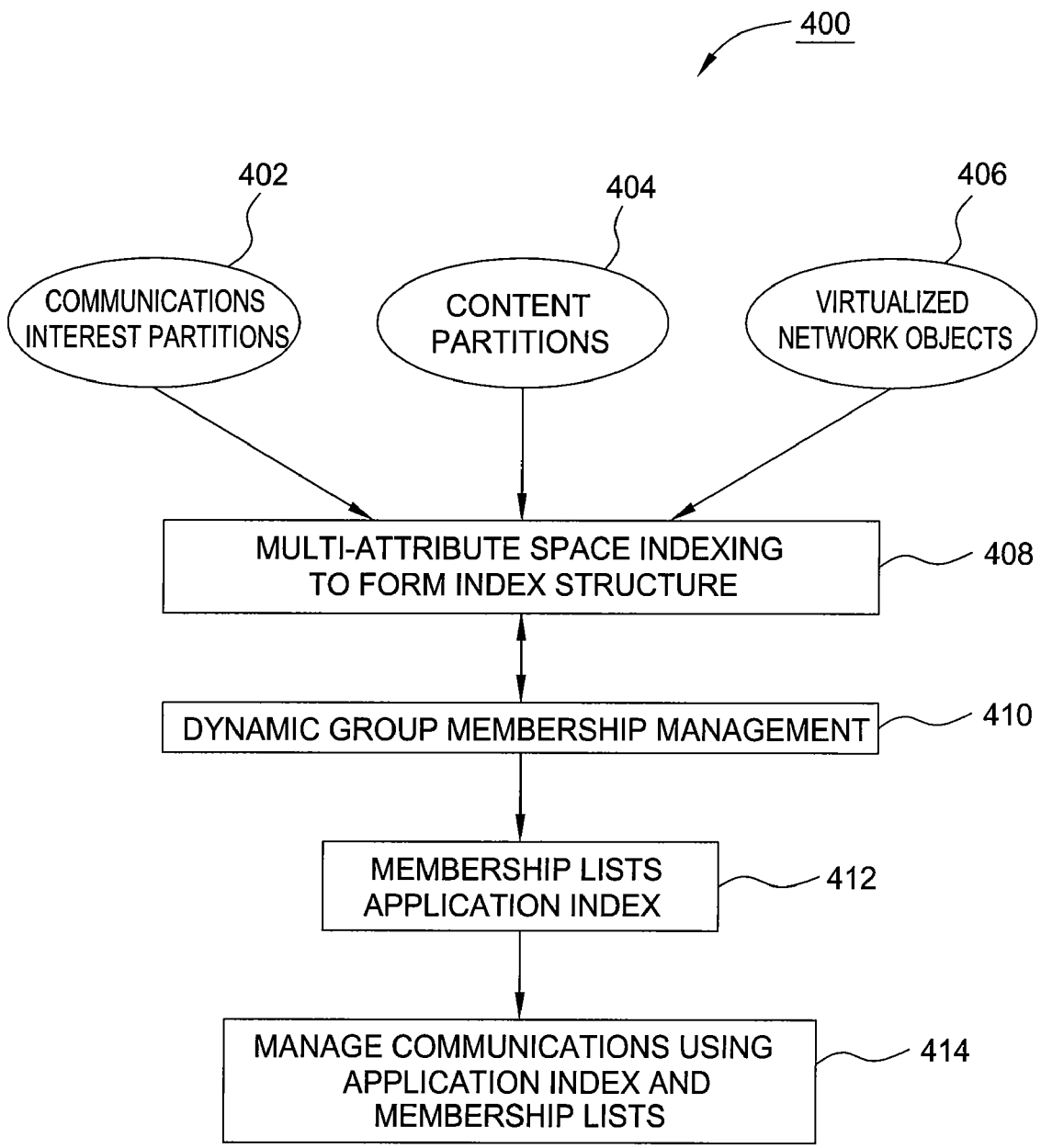
FIG. 4 illustrates a functional flow diagram of the group management method.

The use of maps in a communication session and data distribution management system 400 is illustrated in FIG. 4. As shown, communication interest partitions 402, content partitions 404, and virtualized network objects 406 are indexed to form a multi-attribute space 408. Based on that indexing group membership is managed 410. This is performed by clustering users/clients according to their communication interests and network objects attributes indexed the multi-attribute space 408. The result is a step 412 of forming a membership list that assigns users to middleware communication nodes and an application index that assigns partitions to middleware communication nodes. Based on the membership lists and the application index, at step 414 the communications are managed using a hierarchical structure that is based on the application index and membership lists. This enables multicast communications by having application servers send specific communications to specific middleware communication nodes that have users that are interested in such communications, and by having those middleware communication nodes forward communications only to the users that are interested in such communications. The application servers know which middleware communication nodes to send what information to, while the middleware communication nodes know who is to receive that information.

Figure 5:
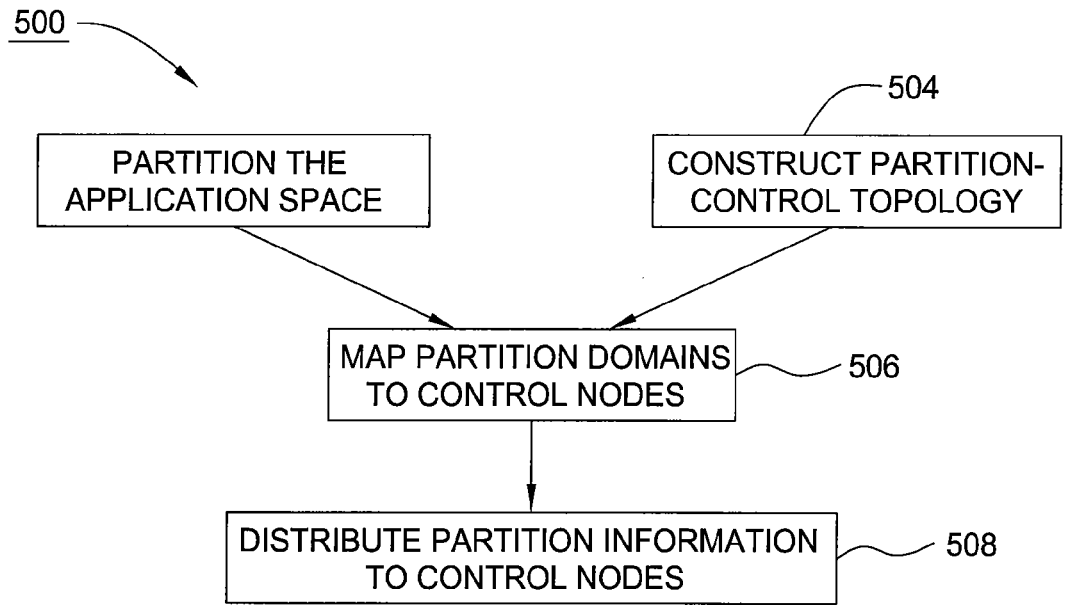
FIG. 5 illustrates distributed partition indexing.

Referring now to FIG. 5, application space partitions can be mapped into a set of connected network nodes (control nodes) using a distributed indexing method 500 in which the mapping function assigns one or several partitions to a control node according to aggregated partition control load. The distributed index function includes the step 502 of partitioning the application space and the step 504 of constructing a partition-control topology. Then, at step 506 a map is formed in which partition domains are mapped to control nodes. An example control topology is the hypercube topology, which gives logarithmic efficiency (measured as number of routing path hops) for routing control messages between any two nodes. The size of the partition-control topology depends on the aggregated control load required to support the communication interest dynamics of the client nodes. The mapping (step 506) of application space partitioning to the partition-control topology is logical; the distance between two partition-control nodes routing is measured as the number of network hops (proportional to the control messaging overhead) rather than distance in network delay space. Each control node has low connectivity (logarithmic with the number of nodes in the control topology). Partition-control nodes forward the message using greedy forwarding. After mapping, at step 508 the partition information is distributed to the control nodes. The load of routing control messages is distributed uniformly among the control nodes (when the control partition queries are uniformly distributed among partition-control nodes).

The mapping of communication interests into multicast groups uses a data structure designed for efficient query of multiple parameters. The output of such queries is a membership list of network objects (identified by their virtualized network ID), which are mapped into communication groups. The mapping can be static, in which case static IDs are allocated for each session, or dynamic, in which case communication groups are formed at run-time according to a dynamic interest based grouping of network objects.

For applications with static group memberships, an efficient method of mapping interest groups into multicast groups is by allocating unique group IDs and by indexing the resulting distribution tree that corresponds to each group ID. This method clusters group members based on multi-attribute clustering and assigns a group ID for each cluster. While this multicast method makes use of the fact that the number of clusters is fixed, changes in node communication interest requires iterations from the current clustering solution, and changes in group membership triggers modification of the multicast distribution trees and modifications of the corresponding multicast group indexing structure. Similarly, changes in the network attributes of overlay nodes results in reconfiguration of the distribution tree and multicast indexing structure.

When the group membership is static, the indexing structure is an extensible table that contains the root of the distribution tree that corresponds to the group ID table entry. The indexing structure supports retrieval of the distribution tree by using the group IDs. Changes of the tree corresponding to a specified group ID can include deletion of a group ID, insertion of a group ID, and/or creation of a new distribution tree from a list of nodes.

In contrast to static mapping, dynamic mapping of interest groups that are identified by a set of descriptors into multicast groups is achieved by including with the routed data a set of group descriptors that are used to query the communication interest indexing structure to retrieve the set of group members that correspond to the described communication interest. The multicast group membership list is constructed by the session management structure and passed to a communication engine, which construct the distribution tree topology. The distribution tree corresponding to a multicast group is comprised of multiple segments, each constructed by a control node that has local multicast group members. The group descriptors and the corresponding group members may be cached at control nodes in the data path such that subsequent data packets with the same set of group descriptors do not require reconstruction of the distribution tree topology. The mapping of interest groups into multicast groups can have an expiry policy in which the mapping between a set of parameters and a distribution tree is deleted when a cached entry is not used for a period of time.

Dynamic session management using multi-attribute clustering can be achieved by a session controller that uses mapping information to generate dynamical group membership lists. Grouping nodes according to their communication interest can be performed to improve or optimize constraints such as forward capacity, round trip time delay, communication efficiency constraints imposed by the application and network infrastructure, and data loss. The application constraints can be modeled using the metrics of delay penalty (delay in excess of the end-to-end delay maximum delay between overlay nodes in the same group), node maximum fanout (the maximum forwarding capacity of each node), grouping waste (the amount of wasted communication capacity due to suboptimal grouping), batching window (the size of the batching window used for aggregating client interest), a look-ahead window (the size of the look-ahead window used for client interest prediction), and a look-ahead factor (a weighting factor used in the look-ahead window).

Inputs to an optimal clustering algorithm include defining interest membership vectors (a list of users/receivers that are interested in each application partition) and an objective (energy) function (a weighted sum of delay penalty, fanout utilization and grouping waste over all clients). Metrics that are useful for measuring the overall efficiency of the membership grouping method include the total fanout utilization (the sum of resource node utilizations for the current grouping considering each group as a unit of load) and the total grouping waste (the sum of communication waste over all nodes in the communication group).

Figure 6:
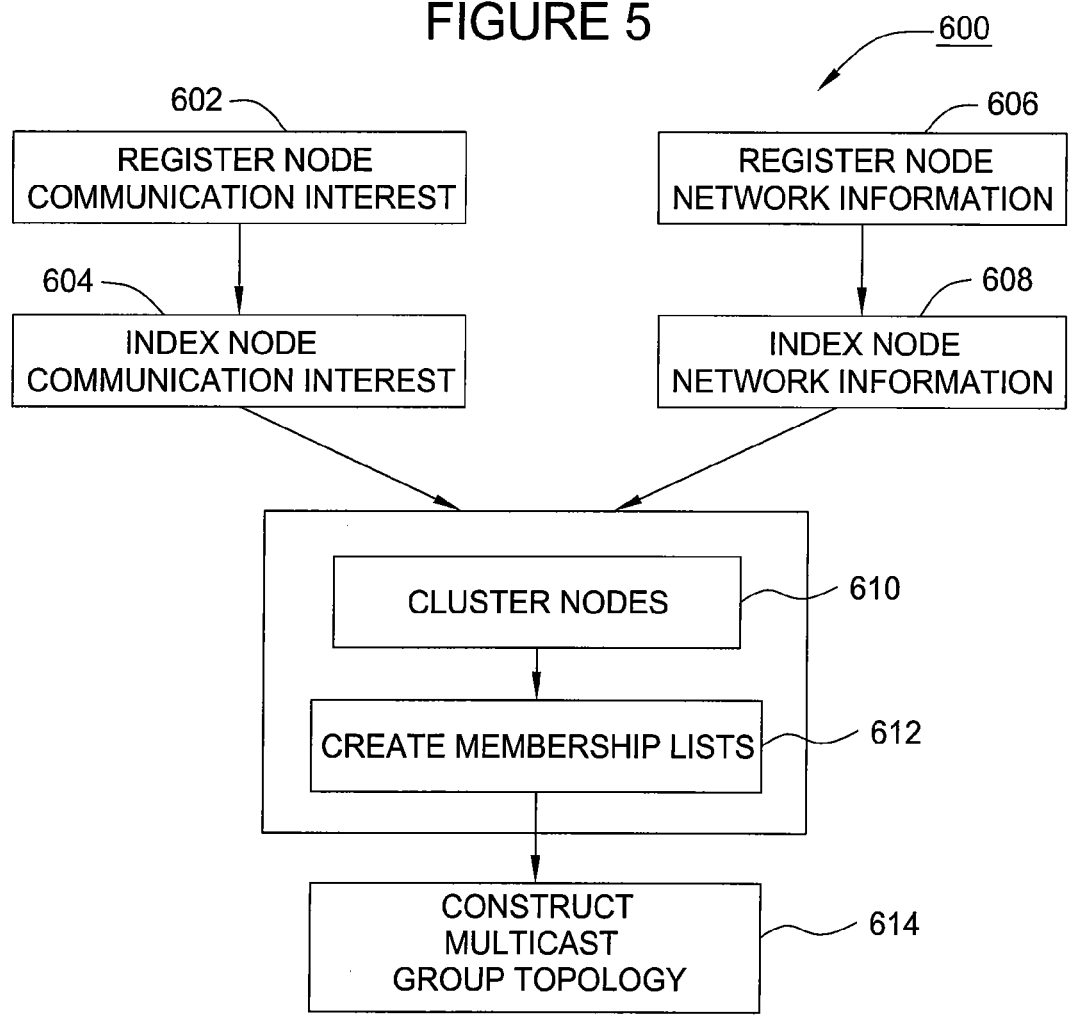
FIG. 6 illustrates a dynamic group management method that uses multi-attribute clustering.

Based on the foregoing, a dynamic group management method that uses multi-attribute clustering is illustrated in FIG. 6. That method includes a step 602 of registering node communication interests. A step 604 uses the registered node communication interests to form a hierarchical indexing of communication interests. The method 600 further includes a step 606 of registering node network information, followed by a step 608 to form a hierarchical indexing of the registered node network information. Based on the indexes formed in steps 604 and 608, the method 600 proceeds at step 610 with clustering nodes using dynamic group management algorithms. At step 612 cell membership lists are generated that correspond to each communication interest group. Finally, at step 614 a multicast group topology is formed.

Due to the mobility in a virtual application space, distributed interactive applications are characterized by high dynamics of client/participant communication interest. A session in a distributed interactive application is associated with each instance of an application. Sessions are decomposed into partitions; each partition grouping involves several cells (units of the virtual application space controlling the group membership of the clients). The dynamics of client interest requires a session management solution that controls client group membership with a minimum amount of signaling. Since the same communication infrastructure simultaneously supports multiple sessions, an effective session management solution needs to scale with the number of sessions and with the number of participants, particularly when each session may involve thousands of participants. The interactive nature of a distributed application imposes constraints on the grouping of participants and on the mapping of the participants into multicast groups that attempt to minimize the end-to-end delay between session participants or to minimize the end-to-end loss rate.

To provide scalable communication management the clients in a virtual space are clustered according to their common interest and according their network attributes. To do so, modeling of the session membership management is useful. Clients accessing services offered by the communication overlay specify their interest by defining a multi-dimensional domain in the application attribute space. In addition, clients are assigned a unique identifier associated with a set of network measurement attributes. Each client then can be mapped into a multi-dimensional space that spans network and session interest coordinates.

The attribute space contains network attributes, including network distance maps and network capacity maps, and application semantic attributes of client's communication interest (e.g. a multidimensional domain in virtual space attributes).

According to the principles of the present invention several methods of session membership control are available. For example, dynamic session membership that uses communication interest descriptors to express a client's interest, and explicit session membership control in which clients change their session interest profile by signaling a parent control node and receiving identifiers for corresponding session/sessions.

A session control method uses either a fixed partitioning of the application space, which is computed centrally at a session agent and replicated at control nodes, or a dynamic partitioning which computes session membership based on client interest and network metric constraints.

In addition to hierarchical indexing of communication groups, group management can use hierarchical aggregation of communication interest. For example the communication interest can be aggregated hierarchically on the overlay control topology. The hierarchical indexing describes the logical relation between overlay nodes. At each control node, the hierarchical structure indexes only a subset of the communication objects (overlay nodes)—the children and siblings of the control node.

Figure 7:
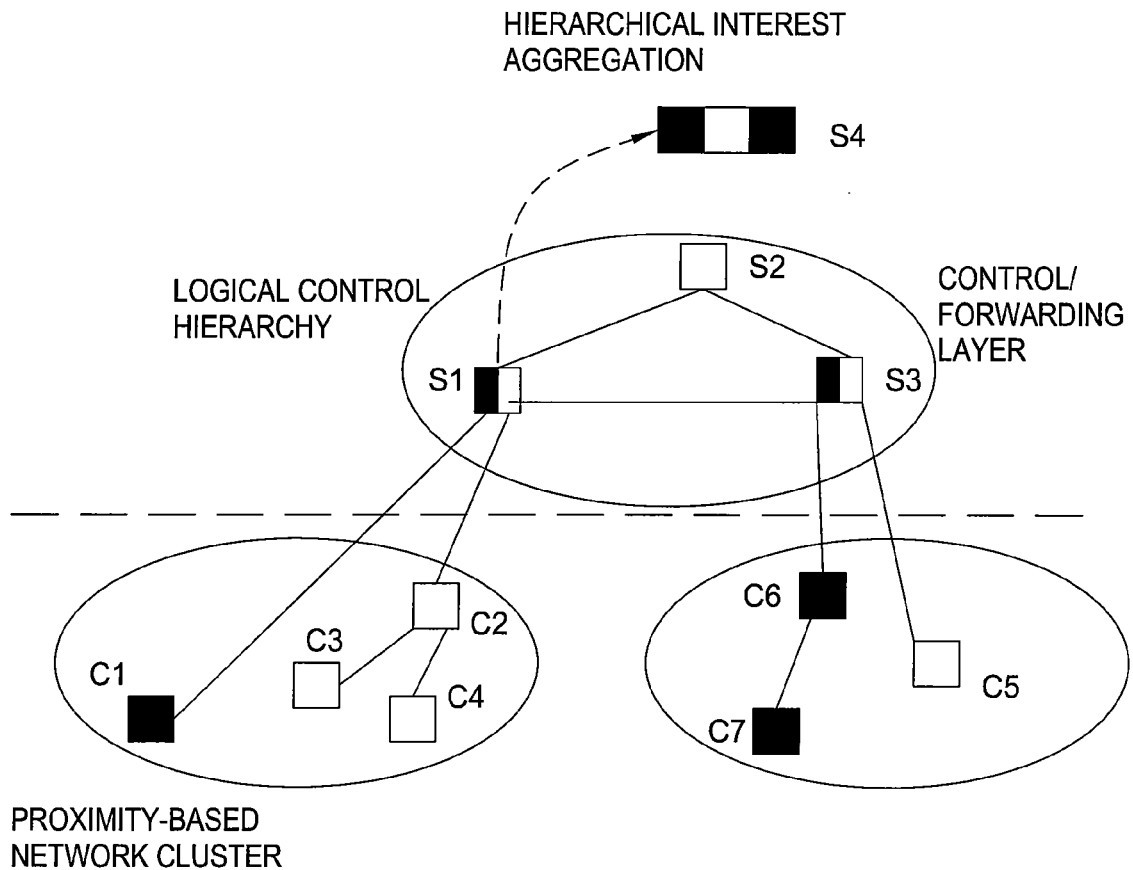
FIG. 7 illustrates hierarchical group management using communication interest aggregation with proximity-based clustering of client nodes and interest aggregation in a hierarchical control topology.
Figure 8:
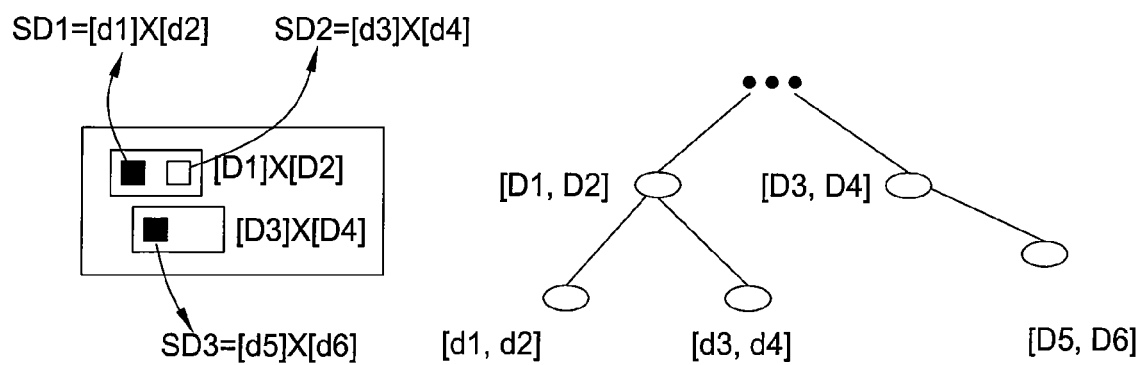
FIG. 8 illustrates communication interest indexed in a hierarchical structure with membership lists that correspond to communication groups stored at the leaf level.

As an example, FIG. 7 illustrates hierarchical group management using communication interest aggregation with proximity-based clustering of client nodes and interest aggregation in the hierarchical control topology. Control node s1 indexes the communication interest of clients {c1,c2,c3,c4} and propagates control messages containing descriptors for active groups in the control hierarchy—e.g., when client node c1 sends a join message indicating its communication interest, s1 inserts a new group with descriptor SD1, adds client c1, and propagates the control message to s4 in the control hierarchy. The control message to s4 cause s4 to add s1 to the group for SD1 (inserting a new group for SD1 in case there were no previous members with such interest) and propagates control messages further in the hierarchy, thus aggregating the communication interest of the lower level nodes. S1 also maps the membership lists corresponding to group descriptors SD1 and SD2 into multicast groups. In FIG. 8 the communication interest is indexed in a hierarchical structure with the membership lists corresponding to communication groups stored at the leaf level.

The topological relation between nodes with the same group communication interest is constructed and modified dynamically by the communication infrastructure (communication engine). The leaf level nodes in the hierarchy are computed by clustering based on user preferences (e.g. transmission rate), network constraints and network topology rank. For each group of nodes with the same application level interest, the communication graph is constructed in a distributed manner by nodes in the control hierarchy, each node controlling the part of the communication graph containing child and sibling nodes only; and each control node optimizes the construction of the communication path independently by using the network and user preference attributes returned by the interest indexing control structure. In addition to modifications imposed by group membership changes, the communication path can be modified without controlling the state of group membership at other overlay nodes.

The independence of session control from data path construction can be obtained using a combination of state-based or stateless mechanisms. A state based control requires signaling between control nodes, and is therefore used when data path changes often. The stateless control, used for high group membership dynamics, reduces the signaling overhead at the expense of per message processing overhead at each forwarding node. The scalability is increased since communication path can include stateless forwarding nodes. Dynamic change of data-path requires little overhead when processing of data path construction algorithms at the control nodes. In a network overlay with hierarchical aggregation of communication interest, the stateless control is advantageous at the leaf level (or levels at the bottom of the hierarchy) where the dynamics of the communication interest is high, while top level of the hierarchy, where dynamics is reduced due to interest aggregation, could use a state based group membership control.

The control of group management uses network space and logical (communication interest space) partitioning. Groups are managed based on a dynamic grouping of participants. Nodes at the higher levels in the hierarchy aggregate sub-domains of the virtual maps. Dynamic management of the groups comprises:

dynamic group management based on proximity on the virtual maps;

dynamic mapping of interest groups into multicast group; and distributed control of group information based on multi-type attribute indexing of communication interest and network resource parameters.

The communication interest space is partitioned and mapped on a logical control topology. Each partition-control node indexes all control nodes with clients whose communication interest overlap with the partition. Each control node (aggregator of client communication interest) connects to a partition-control node, which route the control messages according to the communication interest descriptor.

The client nodes (senders and/or receivers) attach to the leaf nodes in the network control hierarchy. The control nodes maintain a hierarchy of the partition domains describing the virtual map. The map is partitioned into sub-domains which can be recursively split depending on the traffic between leaf nodes. The communication group indexed at a control node contains all client nodes proximal (in the network space) to the control node, participating in the same group, and the sibling nodes in the data dissemination/forwarding layer with clients participating in the group. The group membership is therefore controlled at several nodes in the forwarding/control layer. The membership lists may overlap: nodes in the forwarding/control may appear in multiple membership lists.

Using local group descriptors instead of global group IDs allows controlling of the scope of group identifiers (group are managed locally by control nodes). The control messages contain a list of descriptors of the inserted/deleted groups and require query/insertion of control information indexing structure at each visited node.

The data dissemination also uses descriptors instead of global identifiers to identify at each control node the list of nodes participating in the same interest group. The virtual ID of these members is obtained by traversing the hierarchical group structure mapped at the leaf node. The leaf node then performs data forwarding to the nodes that participate in the same group, which is forwarded further to receiver nodes.

The group management method described here is based on replication and aggregation of group information at control nodes organized in a hierarchical topology. The participating overlay nodes are identified by virtual IDs assigned according to their network attributes. The dynamic group management is designed symmetrical with respect to receiving and sending operations. The hierarchical aggregation of interest reduces exponentially the signaling between control nodes. Dynamic group management involves the following operations:

Group creation;
Group deletion;
Node joining; and
Node leaving.
Group creation/deletion:

Local groups are created/deleted based on the output of the local client node clustering. Groups are also deleted when the membership lists become empty; new local groups are created when a client node specify in the join request a communication interest for which there is no membership list indexed at the control node. Local group creation is followed by a distributed group look-up to find the control nodes with communication groups for the same communication interest and announce at the same time the identity of the new control node that created the local group. Local group deletion triggers a distributed group remove in the control hierarchy to announce the interested nodes the leave of the control node that deleted the group.

Receiver/Sender Node Join:

The node join/leave messages are sent to the control node handling the client in the network topology. The "node join" triggers at the control node the insertion of the virtual node identifier in the membership list corresponding to the communication interest described in the join control message. If a group corresponding to the specified communication interest does not exist, a new local group is created as described above.

Upon receiving a node leave message, a control node delete the virtual ID of the sender from the group membership list corresponding to the specified communication interest. As noted above, this triggers a group deletion when the leaving node is the only member of the group.

Algorithms for node join/leave and group creation/deletion.

The SD is the descriptor list which describes the communication interest of the joining/leaving node. The joining/leaving node has the virtual ID cID; the parent/control node of client cID has the virtual ID pID.

---

Node Join
    Client cID sends a join [SD] message to the parent pID
        At the parent:
            Query indexing structure to retrieve the group entry corresponding to (SD);
                If (no entry for SD)
                    Create_group(pID, SD);
                    Insert cID in the membership list of group (SD);
                    else insert (cID) in the membership list of group (SD).

---

Node Leave:
    Client cID sends a remove [SD] control message to the parent pID;
        At the parent:
            Remove the ID of the leaving node entry from the group with descriptor SD;
                If (Membership List of group (SD) = = NULL);
                    remove group with descriptor SD
                    Delete_group (pID,SD).

Create_group (nodeID, SD):
1. Insert a group corresponding to (SD) in the group indexing structure;
I. Control message propagation:
  Propagate up:
    a. Send control messages including the node ID and the group descriptor to the parent node; stop if root of the control hierarchy;
    b. Insert the node ID received at the parent node in the membership list corresponding to group (SD);
    c. If SD membership list contains other members besides the one just inserted go to e.
    d. Update the propagated ID with that of the current node and update the group descriptor and repeat from a.
    e. Propagate down:
    f. Propagate the control message including the node ID and the group descriptor SD to all nodes listed in the SD entry except for the originator;
    g. if (current node is leaf): insert the ID of the originator node in the SD entry; reply to the originator with the ID of the current node; stop.
    h. else update the propagated ID with the ID of the current node and repeat from e.
II. Tree processing: At originator node:
  Insert the ID in the membership list corresponding to SD entry when receiving a reply from node ID.
Delete_group (nID, SD):
I. Message propagation:
1. Query the group indexing structure to retrieve the membership list corresponding to SD;
  if (membership list is not null):
  Propagate leave message with the node ID and the group descriptor to:
    nodes in the SD membership list; delete the nID;
    parent of the current node, recursively until reaching the root of the control hierarchy, updating the forwarded node ID at each step;
II. Grouping index processing:
  At each node receiving the delete-group message: remove the node ID of the node who propagated the delete message from the SD;

While the foregoing is directed to embodiments of the present invention, other and further embodiments of the invention may be devised without departing from the basic scope thereof, and the scope thereof is determined by the claims that follow.

The invention claimed is:

1. A session management method for distributed interactive systems comprising:
  identifying an application having an application space;
  partitioning the application space into a plurality of communication interest partitions;
  identifying network resources having network characteristics;
  mapping the network resources based on the network characteristics to produce network map information, wherein the network characteristics comprise at least one of: a network fanout, a network delay, or a network forwarding capacity;
  indexing the plurality of communication interest partitions and the network map information to form a multi-type attribute index structure;
  grouping users into communication interest-based groupings; and
  managing communications between one of said users and the application through the network resources using a hierarchical structure that is based on the multi-type attribute index structure and on the communication interest-based groupings,
  wherein at least one of: said identifying the application, said partitioning, said identifying the network resources, said mapping, said indexing, said grouping, or said managing is performed using a processor.

2. The method of claim 1 further including dynamically assigning users to a communication interest-based grouping.

3. The method of claim 2 further including dynamically assigning users to a communication interest-based grouping based on network map information.

4. The method of claim 1 further including statically assigning users to a communication interest-based grouping according to their communication interest.

5. The method of claim 1 including forming communication interest partitions based on user preferences.

6. The method of claim 1 further including the step of disseminating data according to the multi-type attribute index structure.

7. A method for dynamic grouping of clients to support scalable group communications in interactive applications comprising:
  identifying an application having an application space;
  identifying a plurality of clients of the application such that each has a communication interest with the application;
  identifying a communication network that handles communications between the plurality of clients and the application and that includes network resources with network characteristics;
  mapping the network resources based on the network characteristics to produce network map information, wherein the network characteristics comprise at least one of: a network fanout, a network delay, or a network forwarding capacity;
  partitioning the application space into a plurality of communication interest partitions, each of which represents a communication interest of at least one client of the plurality of clients;
  indexing the plurality of communication interest partitions and the network map information to form a multi-type attribute index structure; and
  grouping the clients based on their communication interest and on the multi-type attribute index structure,
  wherein at least one of: said identifying the application, said identifying the plurality of clients, said identifying the communication network, said mapping, said partitioning, said indexing, or said grouping is performed using a processor.

8. The method of claim 7 further including forming a hierarchical structure for communicating data to the plurality of clients such that the hierarchical structure is based on the attribute index structure and on the client groupings.

9. The method of claim 8 including forming the hierarchical structure such that it includes a parent node and at least one control node.

10. The method of claim 9 in which the parent node establishes a communication overlay that directs communications between the plurality of clients and the application.

11. The method of claim 10 in which the parent node produces a membership list of clients having an interest in at least one communication interest partition.

12. The method of claim 11 in which at least part of the membership list is replicated in the at least one control node.

13. The method of claim 11 such that the membership list maps into communication groups to enable distributed communication between the plurality of clients and the application.

14. The method of claim 11 such that the membership list is updated upon a client entering or leaving the plurality of clients.

15. A computer readable storage medium containing an executable program that causes a processor to perform a method for providing middleware control of group communications in a distributed interactive application such that the middleware:

identifies an application having an application space;

identifies a plurality of clients of the application and the communication interest of each client with the application;

identifies a communication network that handles communications between the plurality of clients and the application having network resources with network characteristics;

maps the network resources based on the network characteristics to produce network map information, wherein the network characteristics comprise at least one of: a network fanout, a network delay, or a network forwarding capacity;

partitions the application space into a plurality of communication interest partitions such that each communication interest partition represents a communication interest of at least one client;

indexes the plurality of communication interest partitions and the network map information to form a multi-type attribute index structure; and groups the clients based on their communication interest and on the multi-type attribute index structure.

16. The computer readable storage medium of claim 15 such that the hierarchical structure has a parent node and at least one control node.

17. The computer readable storage medium of claim 16 such that the hierarchical structure includes a communication overlay that directs communications between the plurality of clients and the application.

18. The computer readable storage medium of claim 17 such that the middleware prepares a membership list of clients having an interest in at least one communication interest partition.

19. The computer readable storage medium of claim 18 such that at least part of the membership list is replicated in the at least one control node.

20. The computer readable storage medium of claim 18 such that the membership list maps into communication groups to enable distributed communication between the plurality of clients and the application.

* * * * *